United States Patent [19]

Ahmed et al.

[11] Patent Number: 4,819,176
[45] Date of Patent: Apr. 4, 1989

[54] PROCESS CONTROL AND DATA COLLECTION SYSTEM

[75] Inventors: Belal Ahmed, Bridgeport; Andrew Eisner, Stamford; Harold Foodman, Norwalk, all of Conn.; G. Cecil Hartley, Seffner, Fla.; Michael Hartley, Seffner, Fla.; Robert Marsh, Brandon, Fla.

[73] Assignee: Treasure Isle, Inc., Tampa, Fla.

[21] Appl. No.: 11,619

[22] Filed: Feb. 6, 1987

[51] Int. Cl.⁴ .............................................. G06F 15/46
[52] U.S. Cl. .................................... 364/468; 364/478; 364/479
[58] Field of Search ............... 364/468, 469, 478, 479; 222/56, 77, 58, 55; 209/509, 523; 414/136

[56] References Cited

U.S. PATENT DOCUMENTS

| | | |
|---|---|---|
| 3,260,320 | 7/1966 | Clamp . |
| 3,814,914 | 6/1974 | List ..................................... 364/479 |
| 3,938,106 | 2/1976 | Becker et al. . |
| 3,946,212 | 3/1976 | Nakao et al. . |
| 3,977,483 | 8/1976 | Greanias . |
| 4,089,056 | 5/1978 | Barna et al. . |
| 4,106,628 | 8/1978 | Warkentin et al. . |
| 4,111,336 | 9/1978 | Ward ................................... 364/479 |
| 4,239,434 | 12/1980 | Gannon ............................. 364/478 |
| 4,320,855 | 3/1982 | Ricciardi ............................ 364/479 |
| 4,368,790 | 1/1983 | Ives . |
| 4,381,545 | 4/1983 | Biddle ................................. 364/479 |
| 4,408,291 | 10/1983 | Gunzberg et al. . |
| 4,420,819 | 12/1983 | Price et al. . |
| 4,549,272 | 10/1985 | Hagan ................................. 364/478 |
| 4,581,704 | 4/1986 | Mitsutawa .......................... 364/479 |
| 4,615,446 | 10/1986 | Pavic .................................. 364/478 |
| 4,632,252 | 12/1986 | Haruki ................................ 364/478 |
| 4,641,753 | 2/1987 | Tamada .............................. 364/478 |

Primary Examiner—Michael R. Fleming
Attorney, Agent, or Firm—Barnes & Thornburg

[57] ABSTRACT

A process control and data collection system which analyzes the data collected to provide information regarding the quality of the raw material supplied by specific vendors, the quality of production for a particular job, the efficiency and quality of the employee's work and the effective yield from raw material to final product on a batch basis. Each of a plurality of remote stations include input devices for providing a measurement of the raw material being processed whether it be weight, count or quality as well as identifying data which may include workstation identification, employee identification, work product identification and processing time. This allows correlation and tracking of the material from the beginning to the end of the process through various steps and comingling of raw materials.

43 Claims, 2 Drawing Sheets

PROCESS CONTROL AND DATA COLLECTION SYSTEM

BACKGROUND AND SUMMARY OF THE INVENTION

The present invention relates generally to multistation processing line data acquisition systems and more specifically the use of such systems to correlate the processing of raw material to finished product.

Production data gathering and processing systems are being used more and more in various production and manufacturing systems for attaining data regarding the production process. For example, these systems have been installed in apparel-related industries and have become more integral with that industry as computer technology grew. In U.S. Pat. No. 3,938,106 to Becker et al., a data gathering system is used for apparel manufacturing wherein the system provides identifying data to be collected at varying work stations along the process of manufacturing clothing. The Becker system provides specifically for different operations to be performed on bundles of clothing, with each operation taking place at a specified work station. Addressable data terminals are provided for each work station and are connected to a central processing unit (CPU) by a common communication channel. The terminals include thumb wheel switches which provide for identification of the particular work station, the operation performed at that station, and the operator identification. Each clothing bundle also has associated with it a punched card bearing a coded signature signal for identifying a particular bundle. The data card is attached to the bundle for traveling therewith and is insertable in the respective data terminal. A timer is further included in the system for providing an indication of the amount of time spent on each production operation, with the timing beginning and ending by the insertion and removal of the data card. A polling station provides for addressing the data terminals of the communication channel, wherein the CPU will continually poll the data terminals for transferring any data to the CPU for subsequent retrieval for analysis of the production process.

U.S. Pat. No. 4,408,291 to Gunzberg et al. describes a point of manufacturing data acquisition system for an industrial facility such as a sewing plant. The system includes a plurality of remote plug-in data terminals, one for each work station, for compiling data and transmitting it to a host computer. The system collects data relating to the operation identity, operator arrival and departure times, the type of shop operation performed and the type of workpiece worked on. The terminals may include a display for providing messages to the operator at the work station in addition to a keypad optionally being provided for entry of specialized data by a supervising operator. Each terminal includes a scanner for scanning identification data encoded on respective identification members, the members being attached to the individual work pieces being encoded for the corresponding work piece I.D. Additionally, identification members are carried by the operator and are encoded with the operator I.D. and shop operation I.D., respectively. This patent suggests that the scannable data on these identification members may be in the form of optical bar codes, punched holes or the like.

U.S. Pat. No. 4,089,059 to Barna et al. describes a system for supervising a plurality of machines in a manufacturing plant, wherein a first electromechanical transducer is associated with individual machines for providing a binary coded representation in a particular machine parameter. A second transducer provides a binary coded representation of the worker identification, the respective machine identification, and any coded technical defects.

These and other data acquisition systems although providing identifying data with respect to the production process, do not provide distinguishing data indicative of certain characteristics of the raw material in combination with other identifying data relating to the production process. This absence of comprehensive data in the prior art prevents measuring yield of raw material. This is especially critical in food processing lines.

It is, therefore, an object of the present invention to provide a processing line data acquisition system which includes providing information regarding the quality of the raw material supplied to the processor, the quality of production for a particular job, and the efficiency and quality of an employee's work in the processing of raw material to final product.

Another object of the present invention is to provide a processing line data acquisition system which provides both data relating to the quantity and quality of the raw material and final product as well as other identifying data of another production process such as work station identification, employee identification, the product identification, and processing time.

Yet another object of the present invention is to provide a processing line data acquisition system including a plurality of remote stations performing various measurements of the raw material at each stage of process or wherein information about the raw material is traceable through the process to the end product.

Still another object of the present invention is to provide a data acquisition system for a food processing line which allows measurement of the yield of the raw material in the final product.

An even further object of the present invention is to provide a processing line data acquisition system for a multistation processing line wherein raw material from different vendors are comingled within the line and the acquisition system is capable of tracing the original raw material through to the final product.

An even further object of the present invention is to provide a sorting system for raw material which is capable of sorting, subdividing and quantifying the raw material from a vendor.

An even further object of the present invention is to provide a processing line data acquisition system which is capable of determining the yield on a station-by-station basis along the process line.

A still even further object of the present invention is to provide a prompting system for the operator of a manual packing operation which increases the speed and accuracy of packing.

These and other objects are attained by a system which includes a plurality of remote stations which implement various measuring functions on the raw material being processed, for example weighing, while collecting identifying data of the production process such as work station identification, employee identification, work product identification and processing time. This collected data is transferred to a central computer by the remote stations for further analysis and evaluation. The computer analyzes the data collected to provide information regarding the quality of the raw material supplied by specific vendors, the quality of production for a particular job, the efficiency and quality of the employee's work and the effective yield from raw material to final product on a batch basis.

One implementation of the processing line data acquisition system includes a first station which is a sorting station for sorting a batch of raw material by preselected criteria into a plurality of grades. The quantity of each of the sorted grades is measured, for example by weighing. The different grades of sorted material are then processed through a first processing step and the quantity, for example weight, is measured after the first processing step. A second processing step is then performed and the quantity, for example weight, of the twice processed material is also measured. A central computer is connected to the sorting and each of the measuring stations for collecting and correlating the measured quantities on a batch basis. Input and output identification indicia are provided at each of the stages such that the batch can be traced between the different processing stations so that the ultimate yield of the raw material to the finished product can be calculated even though different batches of different grades may be comingled. By inputting operator identification and calculating processing time, the system is also capable of measuring the efficiency and quality of employee performance.

The sorting station and measuring device allow for verification of the quantity and grades of the material being invoiced by the supplier. A plurality of individual scales are provided for each sorted grade and is connected thereto by a dispenser such that the sorting and weighing can sort, subdivide into a plurality of sub-batches of a desired weight and weigh the total amount of raw material of each grade. A local computer at the sorting and first weighing station allows for entry of the vendor, estimated grade and operator and station I.D. The sorting station is capable of sorting the size of the raw material, and determination of quality, generally by the operator is inputted. Thus, the size plus the quality determines the ultimate grade of raw material. A zeroing or tar switch is provided at each of the weighing stations such that a plurality of sub-batch containers may be sequentially weighed and rest simultaneously on a given weighing device. Displays are provided at the scales for indicating target weight and prompting information. A central computer coordinates the individual scale control which in turn control the dispensing of the sorted raw material.

The system also provides at one of the processing stations, which separates the desired material from its casing means for monitoring a batch of raw material. The system includes a control for transmitting and receiving data into which is provided an input batch identification and quantity and an operator identification and output batch indenfitication and target quantity. A quantity, for example weight, of the post-processed desired material is measured and provided to the control which determines a yield from the inputted batch quantity and the measured post-processing quantity. More than one batch identification may be provided at the input. The inputted batch is distributed among a plurality of operators and the measuring device is capable of having inputted the operator identification for post-processed desired material from each of the operators and providing an accumulation for each of the operators as well as for the whole process line. This allows monitoring of the individual operators' efficiency as well as the ability to produce a desired target quantity, or weight, to complete a job. The time it takes to complete a job is determined from the starting time of distribution to the finishing time of measuring the last post-processed material. The time determination circuit also includes the ability to begin distribution of a second job while the measuring is still being conducted for the first job.

One of the substations is a packing station and includes a prompting system. This includes a scale for weighing a package and its contents and prompting system connected to the scale for displaying to an operator, as a function of a target weight and the type of product to be packaged, full speed packing, reduced speed packing and stop packing when the target weight has been reached. An additional display may be provided for displaying adding-one-more-of-the-product to reach the target weight as well as an over-target indication. The prompting system can also determine how many packages an operator has completed in a period of time and measure the time period. A central system for the packing line can determine the number of packages completed by each operator and the total number completed by all operators. An indicator may be provided when the total for all the operators has met a preselected value for a given job.

The systems were designed for food processing, but may be used with any processing wherein the desired yield and other information collected by the present system is desired.

Other objects, advantages and novel features of the present invention will become apparent from the following detailed description of the invention when considered in conjunction with the accompanying drawings.

DETAILED DESCRIPTION OF THE DRAWINGS

Figure 1:
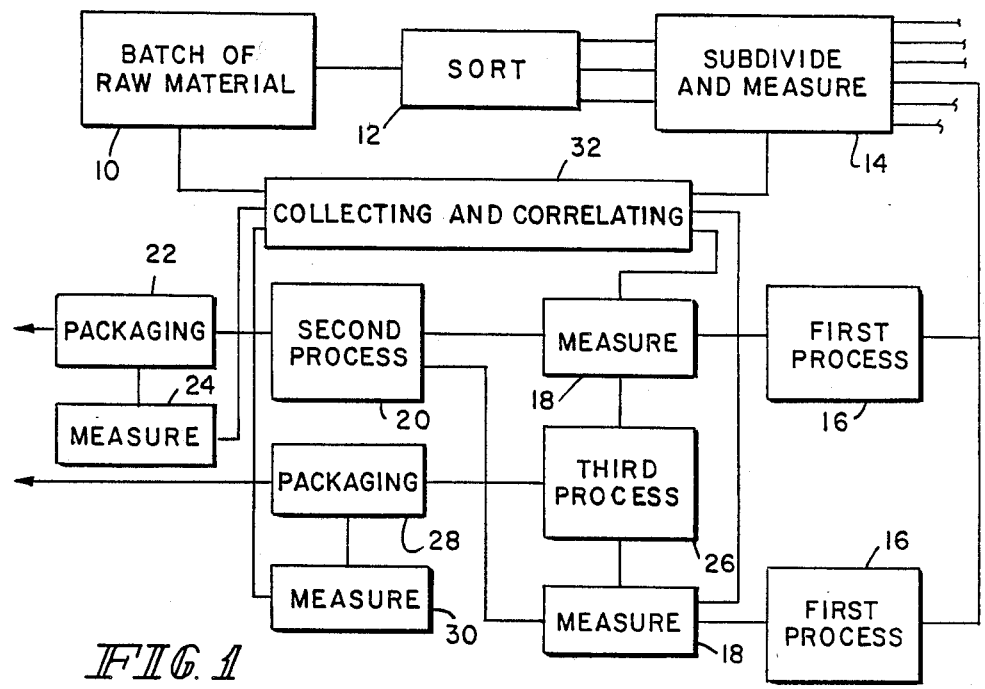
FIG. 1 is a block diagram of a system or process incorporating the principles of the present invention.

The overall process, which is capable of determining the yield from the original raw material to the finished product is illustrated in FIG. 1. A batch of raw material is introduced at 10 and is identified as to vendor and invoiced quantity and quality. The batch is sorted at 12 by preselected criteria into a plurality of grades. These grades are subdivided into sub-batch groups and measured at 14. The subdivision allows for further processing of more manageable quantities of the raw material and the comingling of equal quality raw material from plural batches. The sub-batches are then provided first to one of a possible plurality of first processing lines at 16. At the conclusion of the first process, the quantity of resulting or post-processed material is measured at 18. One or more batches may be processed at the first process 16 and combined to meet a target measurement at 18. The results of the targeted measurement first processed material is then provided from one or more first process and measurement stations 16, 18 to a second process 20. The output of the second process is provided to a packaging station 22. Measurement 24 is performed at the packaging station 22 to provide a given quantity per package. A total number of packages is also accumulated. The results of the first process 16 may alternatively be provided to a third process 26 different from the second process 20. Alternatively, the first process 16 may result in two types of end products which require separate processing. The result of third process 26 is provided to a packaging station 28 which includes a measurement 30.

At each of the processes 16, 20, and 26 and packaging 22 and 28, identification data is collected at the input and new identification data is provided on the output. The identification data and measured results are collected and correlated at 32 from all the process steps. This allows tracking of the raw material from the batch of raw material 10 to the output or final product from packaging stations 22 and 28. Thus, the yield can be determined. Similarly, measurements may be performed at the different measuring stations 14, 18, 24 and 30 on an operator-by-operator basis and thus, the production level of the individual operators can be measured. Similarly, the time of processing of the individual process may also be determined.

An example of one implementation of the process of FIG. 1 will now be described. Raw material, for example shrimp, are provided by a given vendor. The shrimp are sorted at 12 by size. The shrimp are then subdivided into boxes having a given weight per box. The shrimp are also classified as to quality. Each box from the subdivided measurement step 14 is provided with an identification as to batch, quality and size. The boxes are then processed at the first processing station 16. This includes peeling the shrimp and deveining it. A particular job may require a given weight of shrimp of a given grade. This target value is selected and boxes of shrimp from more than one batch of a given size and quality may be simultaneously processed at the first processing station 16. The box number is entered at the beginning of the process 16. The shrimp minus its veins and shells are measured at 18 and collected in a tub with a job identification. This is generally a hand process and the individual operators provide their identification on the processed shrimp which is provided to the weighing station 18.

The target weight of peeled shrimp in the tub having the particular job identification is provided to the second process 20. This process includes breading. Because of the handling of, for example shrimp, the whole shrimp is provided to the breading process 20, whereas the broken shrimp are provided to a third process 26 for use in a separate and distinct final product. The output of the breading process 20 is provided to packaging station 22. The tub identification number is provided at 22 as an input data. The breaded shrimp are packed at 22 by operators for a given weight per package as determined by the measurement step 24. As will be explained more fully below, prompting is provided at 24 to accelerate the packaging process and its accuracy. The production rate of the individual operator is measured and the output of the total packaging line is accumulated to meet a desired job or order.

Information on the production of each of the operators as well as the time it takes to produce a given output are collected and correlated at 32 by a central computer. The central computer by collecting the information is able to determine the yield on a batch basis, from the batch of raw material at 10 to the output of the packaging stations 22 and 28. The collected data will also allow evaluation of the efficiency and quality of the employees along the processing line.

Figure 2:
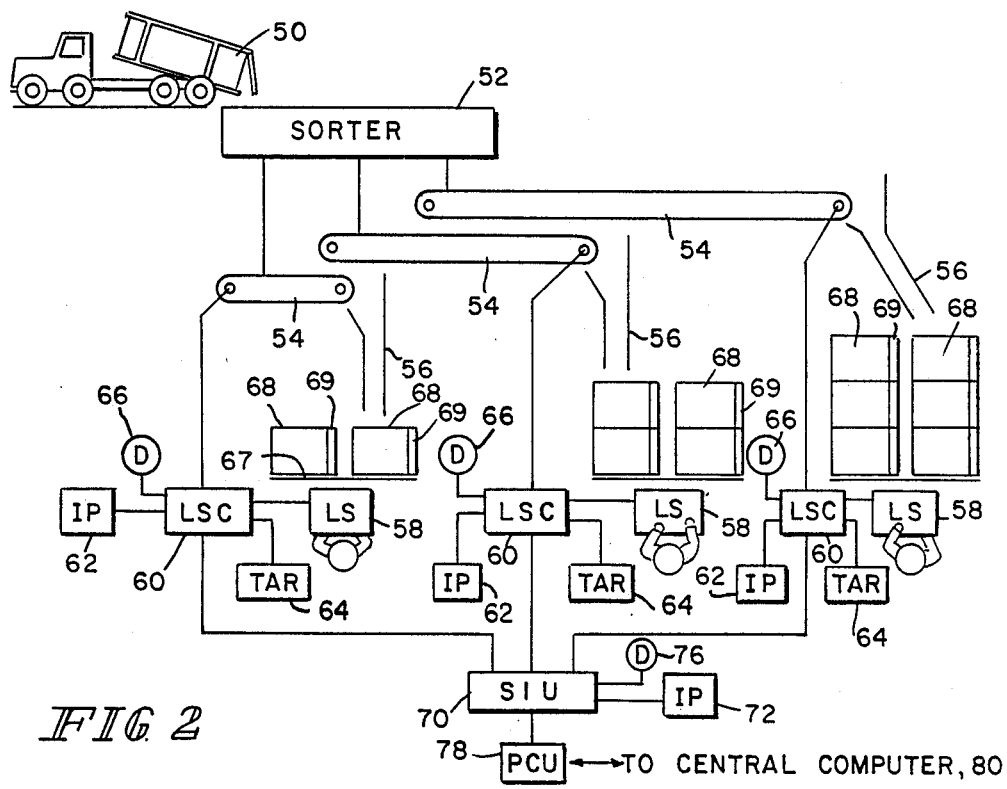
FIG. 2 is a schematic representation of a sorting and weighing station incorporating the principles of the present invention.

The first stations line of the overall system is illustrated in FIG. 2 is the sorting line. A load or batch of raw material having a specific weight and size is delivered by the vendor and illustrated as a truck 50. This raw material is inserted into a sorter 52. The sorter sorts the product by size and may include a conveyor belt having divergent rollers. The raw material sorted by size are provided to a plurality of conveyer belts 54 which have a respective shute 56. Below each shute 56 is a weighing device or load cell 58 with a platform thereon. A Local Scale Controller (LSC) 60 is provided at each substation which receives signals from the load cell 58, inputs from input pad 62 and tar switch 64 and provides signals to a display 66. The conveyer belt 54 at each of the substations is controlled by the local scale controller 60. Each LSC 60 is connected to a Systems Interface Unit (SIU) 70 also having a data entry device, for example keypad 72, and a display 76. A Protocol Converting Unit (PCU) 78 connects the SIU 70 to a central computer 80. As it will be explained below, the SIU 70 provides control information to the LSCs which control the process, collect data and report back to the SIU. The SIU through the PCU communicates with the central computer. A polling system is included for polling the respective SIUs of each of the stations along the processing line. Such a data can be collected for analysis and correlation.

The grade, color and desired weight per box of the raw material for a particular job is programmed into the SIU 70 as well as a code representing the vendor who supplied the raw material to be processed and the I.D. numbers of the employees associated with the particular job. The vendors indication of weight and grade is also entered by input 72. The SIU 70 will transfer the necessary operating instructions, for example target weight per box, to a respective LSC 60 assigned to receive the preselected grades of product from the sorter 52. The LSC 70 prompts an operator via a message on the display 66 to begin setting up for loading process. This includes placing a pallet 67 on the weighing scale and a layer of boxes 68 on the pallets. Ice, or other materials may be initially placed in the boxes before the raw material is loaded therein.

The operator begins the loading process by activating the LSC 60 by the tar switch 64, which in turn resets the zero weight and starts the conveyer belt 54 to unload the proper size product in the assigned chute. The LSC 60 will monitor the weight as it is being loaded, stopping the conveyer 54 when the selected target weight is reached. The SIU 70 will store data relating to a preprocessed box identification number, the preselected grade size, the preselected color code, the target weight of the raw material in the particular box and the time of day the unloading was completed. The box identification number comprises the day of week, the assigned respective chute number, and a box count number which increases with each box. The box identification number is provided to the individual LSC 60 to be displayed to the operator who marks it at 69 on the respective box 68.

The SIU 60 will transmit the data to the central computer 80 via the PCU 78 when polled by the computer 80.

When a particular box has reached the target weight, the operator then provides another layer of ice or material on the top thereof and moves the chute 56 to the next box in the layer. He reactivates the LSU through the tar switch 64. This allows individual weighing of each of the boxes 68 to the target weight. When a layer is completed, another layer of boxes are placed thereon. Once the sorting and sub-batch boxing of a load from a particular vendor has been completed, as indicated by activation from one of the input devices 62 at the LSU or 72 at the SIU, the SIU collects the information, putting an appropriate header for communication and waits to be polled by the central processing unit. Depending upon the system use, the SIU 70 may alternatively send a signal indicating completion of the job through the PCU 78 to the central processor 80 requesting polling.

The second stage is the peeling line where the sorted and sub-batched boxes of raw material, for example shrimp, is Processed to separate desirable material from its casing, for example peeling and deveining. Each peeling line includes means for collecting data relating to the raw material, e.g. the identification of the preprocessed raw material; the weight after processing; the employees working on the raw material; and the amount of time involved in the processing. The target or desired weight for a job, and output tub identification is also collected. The central computer 80 receives this information for providing data relative to employee efficiency and productivity in addition to providing data relating to the yield of the product for a given a job.

Figure 3:
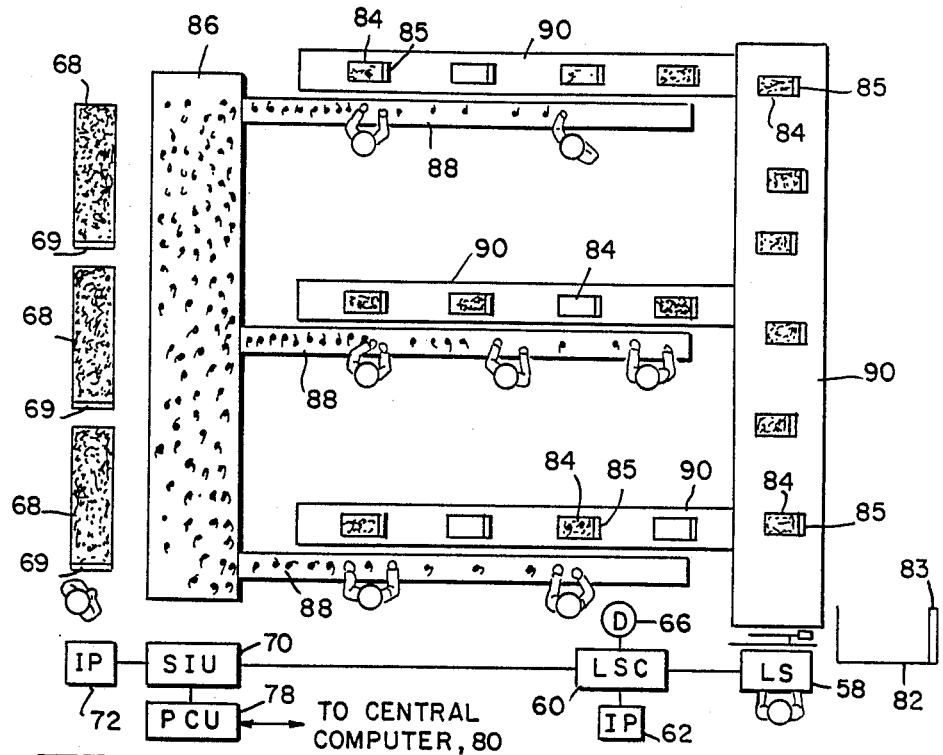
FIG. 3 is a schematic representation of a manual processing line for separating desired material from a casing, incorporating the principles of the present invention.

Each peeling line, as illustrated in FIG. 3, includes one LSC 60 at the end of the peeling line and one SIU 70 arranged at the beginning of the peeling line. The LSC and SIU include respective keypads or input terminals 62, 72 for allowing direct data input. Information relating to the target weight of the particular job, the preprocessed incoming box 68 I.D. number 69 and the initial outgoing post-processing tub 82 I.D. number 83 are entered. Employee identification numbers may be entered into the system at the LSC either by swiping a bar code optical reader across an employee I.D. tag 85 attached to the respective employee's tray 84 or by entering the employee number directly on the keypad 62. Since a particular grade and style of processed raw material may be needed for a particular job, sub-batch boxes 68 from more than one vendor may be processed and provided into tub 82. Thus, the recording of the information of the input box I.D. 69 and the out tub I.D. 83 allows comingling of raw material while allowing tracing or accountability between the input and the output. This will allow the central computer 80 to track and correlate the raw material throughout the total system to determine the yield at each stage as well as from the input as raw material to the finished product at the output of the total system.

The operation begins by loading a plurality of boxes 68 of sorted preprocessed raw material into input bins 86 wherein the raw material is distributed by conveys 88 to a plurality of subpeeling lines. The operators along the conveys 88 process the raw material separating the desired material from its casing. With the example being used of the shrimp processing, the shrimp is peeled and deveined depending upon the desired style. The resulting processed raw material is then placed on trays 84 which have the operator code 85 thereon. These trays of processed product are loaded on conveyer belt 90 and are transmitted to a key operator, who then weighs the product on a scale 58. Prior to weighing, the operator will enter the particular employee's number 85 by either swiping the bar coded tag attached the tray or by entering the I.D. number in the LSC keypad. The processed raw material is then unloaded from the scale 58 into a tub 82, with the latter being continually filled until the preselected target weight for a given job is reached.

A display 66 is provided for each peeling line at a point where the peelers may observe the amount of raw material processed for each employee and a total for the job. The time taken for performing a particular job is also provided. This represents the first process 16 in FIG. 1.

The peeling line is designed such that as one job having a first prescribed target weight is being finished, a new job having a second target weight or grade or style may begin. This is accomplished by providing buffers at both the starting point and weighing point of each peeling line, such that, the starting time for a new job is stored in the LSC 60 at the peeling line starting point, while the weighing information on the finishing trays of the previous job is taken at the weighing end.

It should be noted that not all of the raw material is processed into the desired configuration for a particular job. For example, if the shrimp is to be whole butterfly shrimp, in the peeling and deveining process, the shrimp may be broken into pieces. These pieces are provided on trays 84 also, but are separately accumulated and weighed so that they can be used in subsequent processing steps different from the whole butterfly peeled shrimp. The employee is credited for the pieces as well as the whole shrimp and this information is used to measure the employee's quality and efficiency. Similarly, this allows collecting information about the particular raw material and has an effect on the ultimate yield of any particular batch or sub-batch. If more accurate information relative to the quality of the performance of each of the individual operators of the stations is needed, a predetermined weight of raw material may be provided to each operator and therefore the weight input and output can be measured on an operator-by-operator basis. Alternatively, the amount of casing, or in this particular example the shells and veins, of the individual operators may also be weighed.

Figure 4:
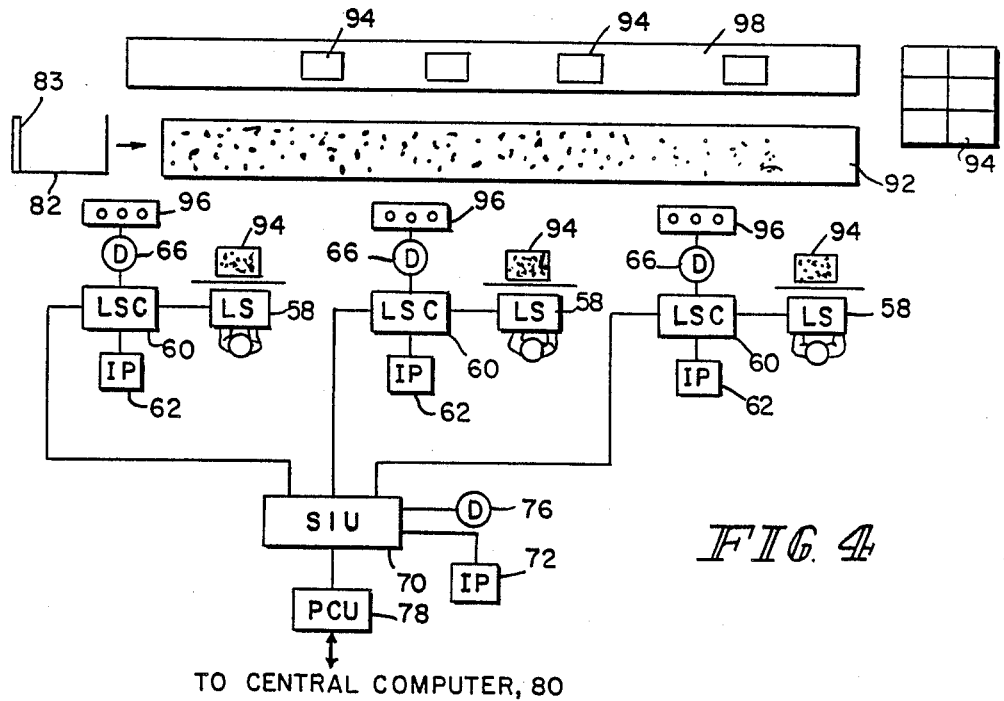
FIG. 4 is a schematic representation of a manual packing line incorporating the principles of the present invention.

The tub 82, full of processed raw material, having a selected target weight is carried over to the breading line which is a second process of FIG. 1. The third process of FIG. 1 is the processing of the pieces of broken shrimp. Peeled material is breaded and then transferred to the packing portion of the line which is represented as 22 in FIG. 1 and which is detailed in FIG. 4. The processed product is provided on a conveyer belt at 92 to individual packaging stations. Each station includes a scale 58, a local scale controller 60 having a keypad 62 and display 66. The SIU 70 provides data to and collects data from the plurality of local scale controllers 60 and itself includes an input pad 72 and a display 76. The information gathered by the SIU 70 is provided to the central computer 80 by the PCU 78. A particular job, defined as the number of boxes to be packed and the input tub identification, is entered into the SIU 70 as well as the weight per box.

The weight per box is transmitted to each of the LSCs 60 which control a special prompting display 96 at each of the scales. The operator places an empty box 94 on the scale 58 and initiates the start packing signal. The prompting display 96 illustrates, for example a green light, indicating full speed packing. The packer continues full speed packing with the LSC monitoring the weight of the package compared to the target weight. As the package gets closer to the target weight, the LSC turns on a second prompt, for example a yellow light, indicating a reduced packing speed. Once the package has reached the target weight, a third or red indicator, is activated by the LSC 60 to stop the packing. There is an indication also given if the package is overweight. To further aid the packer, the display 66 may provide a red light stopping the packing and provide an indication on the display 66 to add one more item to the package. The LSC would calculate this from the particular style of product being packaged and from the desired target weight. The operator begins the cycle again by placing a box on the scale and reactivating its LSC 60.

The finished package 94 is provided on an output conveyer 98 where the individual boxes may be placed into a larger container or crate. The SIU 70 collects data and counts the total number of boxes being packed and compares it against the target count for the job. Once the target count has been reached, the system can either shut down or a new box can be used to begin another job using the same processed material. As in the previous stations, the efficiency of each of the operators can be measured. The log-on and log-off time of the individual operators as well as their employee numbers can be entered into the system at the input pad 62. The number of boxes packed by the operator is also collected by the SIU 70. The display 66 can keep a running total of the boxes packed by the individual packers as an incentive.

Depending upon the particular processing line, a checking station may be provided at the end of conveyer belt 98 to verify the resulting packaged material. In some industries, it is important that a minimum count per box be provided in addition to a target weight. The checker can verify this count and alter it if need be. Besides altering the contents of individual boxes, new input may be provided to the SIU 70 of the packaging system to modify the target weight per box such that the weight and count are optimized.

It should be noted that as in the peeling line, the input to the breading station and the packaging line may be from a plurality of peeling lines. Thus the input of the tub number 83 from the individual tubs at the input of the breading line are provided to the SIU.

The central computer 80, not illustrated, is a general purpose computer, capable of polling individual stations and processing and collating data. Since the system collects information from each of the substations which includes the input identification as well as an output identification, the central computer can trace, from the input through the total system to the final product. Even though the input material may be comingled throughout the process, data can be traced from the output product back to the raw material. This will allow processing on a batch basis and calculate the yield of each of the input batches. As discussed above, the system is also capable of collecting information on the efficiency and quality of work of the individual operators at the individual stations.

From the preceding description of the preferred embodiments, it is evident that the objects of the invention are attained, and although the invention has been described and illustrated in detail with respect to food processing, it is to be clearly understood that the same is by way of illustration and example only and is not to be taken by way of limitation. The spirit and scope of the invention are to be limited only by the terms of the appended claims.

What is claimed is:

1. A processing line data acquisition system for a process line having a sorting and first and second raw material processing steps comprising:
   sorting means for sorting an identified batch of raw material by a preselected criteria into a plurality of grades;
   first measuring means for measuring total quantity of each grade of raw material sorted by said sorting means for a batch;
   second measuring means for measuring a quantity of raw material after a first raw material processing step for portions of identified batches;
   third measuring means for measuring a quantity of processed material after a second processing step for portions of said identified batches; and
   central computer means connected to said sorting means and each measuring means for collecting and correlating the quantities measured on an identified batch basis.

2. A system according to claim 1 including:
   first input means at said first measuring means and connected to aid central computer means for inputting batch identifying data to said central computer means;
   second input means at said second measuring means and connected to said central computer means for inputting batch identifying data to said central computer means; and
   third input means at said third measuring means and connected to said central computer means for inputting batch identifying data to said central computer means.

3. A system according to claim 2, wherein said first input means includes means for inputting source of said batch, estimated grade, and batch identification.

4. A system according to claim 3, wherein said first input means further includes means for inputting preprocessing sub-batch identification by grade, said second input means includes means for inputting said preprocessing sub-batch identification and Post-processing sub-batch identification, and said third input means includes means for inputting said post-processing sub-batch identification.

5. A system according to claim 4, wherein said first input means further includes means for inputting workstation identification and operator identification; and said second and third inputs means further include means for inputting workstation identification, operator identification and duration of processing step.

6. A system according to claim 1, wherein said first, second and third measuring means measures the weight.

7. A system according to claim 1, wherein said sorting means sorts into grades by size and said first measuring means measures weight of said sorted raw material.

8. A system according to claim 1, wherein said second measuring means includes sensing means for sensing weight and local computer means connected to said sensing means for calculating a weight from said sensed weight and calculating a total weight for a series of sensed weights.

9. A system according to claim 8, including input means connected to said local computer means for inputting batch identify data and employee identity data for each sensed weight.

10. A system according to claim 1, wherein said third measuring means includes sensing means for sensing weight, input means for inputting grades and target weight, local computer means connected to said sensing means and input means for calculating the difference between the sensed weight and the target weight and calculating from the grade the number of processed items to be added to reach said targeted weight.

11. A method of monitoring processing of a batch of raw material comprising the steps of:
sorting a batch of raw material by a preselected criteria into a plurality of grades;
measuring total quantity of each grade of raw material for said batch;
processing said sorted batch of raw material which results in a loss of quantity;
measuring the resulting quantity of said batch after said first processing step;
packing said processed raw material with a given quantity per package; and
counting total number of resulting packages for said batch.

12. A system according to claim 11, including filling means between said sorting means and said sensing means for filling containers on said sensing means to a desired weight under the control of said local computer means.

13. A system according to claim 12, wherein said local computer means includes means to accumulate a plurality of weights for a plurality of tar switch means activation to produce a total batch weight.

14. A method of monitoring processing of a batch of raw material comprising the steps of:
sorting a batch of raw material by a preselected criteria into a plurality of grades;
measuring the quantity of each grade of raw material for said batch;
processing said sorted batch of raw material which results in a loss of quantity;
measuring the resulting quantity of said batch after said first processing step;
packing said processed raw material with a given quantity per package; and
counting the number of resulting packages for said batch.

15. A method according to claim 14, wherein said sorting step includes sorting by size and said first mentioned measuring step includes weighing.

16. A method according to claim 14, wherein said processing step includes removing the desired material from its casing and wherein said second mentioned measuring step includes weighing said resulting desired material.

17. A method according to claim 14, wherein said packing includes packaging a given weight of processed raw material.

18. A method according to claim 14, wherein said first mentioned measuring step includes dividing each of said grades into preprocessing sub-batches of a predetermined quantity.

19. A method according to claim 18, wherein said processing step includes subdividing a sub-batch into a plurality of micro-batches to be processed and said second mentioned measuring step includes measuring individually processed micro-batches and combining them to meet a target quantity.

20. A method according to claim 14, wherein said packaging step includes weighing the contents of a package during packaging, and displaying the number of items of processed raw material needed to meet a target weight.

21. A system for sorting a batch of raw material comprising:
sorting means for storing a batch of raw material by preselected criteria into a plurality of grades;
a plurality of dispensing means each for receiving from said sorting means and dispensing a grade of sorted raw material;
a plurality of control means each connected to and controlling a respective dispensing means to dispense preselected quantities of sorted raw material to form sub-batches of a grade of a batch; and
interface means connected to said plurality of control means for coordinating the operation of and collecting quantity data from said plurality of control means and for determining a total quantity per grade for said batch.

22. A system according to claim 21, wherein each of said control means includes scale means for sensing weight and scale control means responsive to said scale means for controlling said dispensing means to dispense a preselected weight of said raw material to form a sub-batch.

23. A system according to claim 22, wherein each of said control means further includes tar means connected to said scale control means and wherein said scale control means controls said dispensing means to dispense a preselected weight with respect to a weight sensed by said scale means at the last action of said tar means so that said scale means may accommodate a plurality of sub-batches simultaneously.

24. A system according to claim 22, wherein each of said control means further includes display means connected to said scale control means for displaying information and said scale control means includes means for determining and providing to said display means sub-batch identification data.

25. A system according to claim 21, wherein said system interface means includes input means for inputting source of said batch and preselected quantity to form a sub-batch.

26. A system for monitoring the processing of a batch of raw material which separates desired material from its casing comprising:
input means for inputting batch identification data, quantity data, and operator identification data;
measuring means for measuring a post-processing quantity of desired material; and
control means connected to said input means and said measuring means for receiving said data and measured post-processing quantity therefrom and determining yield from said input of batch quantity and measured post-processing quantity.

27. A system according to claim 26, wherein said control means includes first means for accumulating measurements of a first quality of desired material and second means for accumulating measurements of a second quality of desired material.

28. A system according to claim 26, wherein said input means inputs a target quantity of desired material for a job, and wherein said control means includes means for accumulating measurements and indicating when said target quantity has been reached.

29. A system according to claim 28, wherein said control means includes means for determining the period of time it took to meet said target quantity.

30. A system according to claim 26, wherein said control means includes means for correlating individual measurements with individual operator identifications.

31. A system according to claim 26, including means for distributing said raw material to a plurality of operators and means for transporting post-processed desired material with operator identification to said measuring means.

32. A system according to claim 31, wherein said control means includes means for correlating individual measurements with individual operator identifications.

33. A system according to claim 31, wherein said control means includes timing means for determining the period of time between the beginning of the distribution of said raw material and meeting a target quantity.

34. A system according to claim 33, wherein said timing means includes means for determining the period of time of a subsequent job which has began distribution of raw product before said target quantity has bene met for previous job.

35. A system for prompting an operator of a manual packaging operation comprising:
   weighing means for weighing a package and its contents; and
   prompting means connected to said weighing means for determining and displaying to an operator, as a function of target weight and type of product to be packaged, full speed packaging, reduced speed packaging, and stop packing when a target weight has been reached.

36. A system according to claim 35, wherein said prompting means further displays adding one more product to reach target weight.

37. A system according to claim 36, wherein said prompting means further displays an over-target weight condition.

38. A system according to claim 35, including means for determining how many packages an operator has completed in a period of time.

39. A system according to claim 36, including means for determining said period of time.

40. A system according to claim 35, including a plurality of weighing means and associated prompting means and a control means connected to each of said prompting means for counting the number of packages completed by each operator and the total of all operators.

41. A system according to claim 40, wherein said control means includes means for indicating when said total for all operators meets a preselected value for given job.

42. A processing line data acquisition system for monitoring the processing of batches of raw material for a process line having sorting and first and second raw material processing steps comprising:
   first means for sorting batches of raw material by a preselected criteria into a plurality of grades and assigning a batch and grade related identification to the sorted raw material;
   second means for determining said batch and grade related identification for all raw material inputted into a first process and assigning a first post-process identification;
   third means for determining said first post-process identification for all first post-processed raw material inputted into a second process and assigning a second post-processing identification; and
   central computer means connected to said first, second and third means for collecting said identifications and correlating them on a batch basis.

43. A system according to claim 42, wherein said first, second and third means each include means for measuring the quantity of material in each assigned identification and said central computer means includes means for determining yield on a batch as is using said measured quantities.

* * * * *